(No Model.) 6 Sheets—Sheet 1.

G. S. DWIGHT, Dec'd.
M. T. Dwight, Administratrix.
PROCESS OF MANUFACTURING GAS.

No. 387,676. Patented Aug. 14, 1888.

Fig. 1.

Attest:
John A. Ellis
Geo. M. Graham

Inventor:
George S. Dwight,
by Munson & Philipp
Attys:

(No Model.) 6 Sheets—Sheet 4.

G. S. DWIGHT, Dec'd.
M. T. Dwight, Administratrix.
PROCESS OF MANUFACTURING GAS.

No. 387,676. Patented Aug. 14, 1888.

Fig. 4.

Attest:
Geo. M. Graham.
A. N. Jasbera

Inventor,
George S. Dwight,
by Munson & Philipp,
Attys.

(No Model.) 6 Sheets—Sheet 5.

G. S. DWIGHT, Dec'd.
M. T. Dwight, Administratrix.
PROCESS OF MANUFACTURING GAS.

No. 387,676. Patented Aug. 14, 1888.

Attest:
Geo. M. Graham
A. N. Jasbera

Inventor,
George S. Dwight,
by Munson & Philipp,
Attys.

(No Model.) 6 Sheets—Sheet 6.

G. S. DWIGHT, Dec'd.
M. T. Dwight, Administratrix.
PROCESS OF MANUFACTURING GAS.

No. 387,676. Patented Aug. 14, 1888.

Attest:
John A. Ellis.
Geo. H. Graham.

Inventor:
George S. Dwight,
By Munson & Philipp,
Attys.

N. PETERS, Photo-Lithographer, Washington, D. C.

UNITED STATES PATENT OFFICE.

GEORGE SPRING DWIGHT, OF HOMBURG, GERMANY; MARY TORREY DWIGHT ADMINISTRATRIX OF SAID GEORGE SPRING DWIGHT, DECEASED.

PROCESS OF MANUFACTURING GAS.

SPECIFICATION forming part of Letters Patent No. 387,676, dated August 14, 1888.

Application filed October 2, 1884. Serial No. 144,535. (No model.)

*To all whom it may concern:*

Be it known that I, GEORGE SPRING DWIGHT, a citizen of the United States, residing in the city of Homburg, Empire of Germany, have invented certain new and useful Improvements in the Manufacture of Water-Gas, fully described and represented in the following specification and the accompanying drawings, forming a part of the same.

The present invention relates to that process or method of producing water-gas in which steam is brought into contact with glowing carbon, thereby becoming decomposed and forming carbonic acid and free hydrogen, after which the carbonic acid thus produced is converted into carbonic oxide by the absorption of a further element of carbon, thus making what is commonly known as "water-gas."

In the process heretofore followed for the manufacture of this gas the combustible gases evolved during the process of bringing the fuel to the required incandescence were led from the fuel or combustion chamber and burned in a regenerating-chamber containing refractory material that absorbed their heat, to be afterward utilized in superheating the steam to be decomposed during the gas-making process, and when it was desired to carburet this water-gas to give it illuminating properties the regenerating-chamber was used to fix and render permanent hydrocarbons, which, but for the intense heat imparted to the chamber and the refractory material therein by the burning gases, would go to the gas-holder in the condition of vapors liable to condense. This process, although a great advance over the old method, is open to serious defects, technical as well as economic, as extended experience has demonstrated. The temperature requisite for the decomposition of the steam is considerably lower than that required to convert the resulting carbonic-acid gas to carbonic oxide. These transformations require the element of time, however imperceptible, and when gases are highly expanded and move at the great velocity which is desirable in practice time is equivalent to distance; hence there is a definite zone in the fuel within the furnace wherein the steam is first decomposed, forming hydrogen and carbonic acid, and another wherein the carbonic acid is converted into carbonic oxide. The chemical action of each zone being distinctly its own, the heightening of the temperature of the first zone will not produce the last-named gas, nor will this gas be formed in the second zone if its temperature be too low. Consequently, if the steam, prior to its contact with the glowing fuel, be superheated to a temperature in excess of that requisite for the first chemical action—viz., its decomposition—this excess of heat only accomplishes a mechanical effect—*i. e.*, imparting its excessive sensible heat to that stratum or zone of fuel where the highest heat is not needed, which causes the resulting gases to pass in a somewhat less heated state to the second zone or stratum of fuel where the highest temperature is in fact requisite, the tendency of which is to reduce the heat and lessen the efficiency of this latter zone. This defect was partly overcome by injecting into the current of steam granulated or pulverized fuel, which to a certain extent utilized its excess of heat, but involved the process with serious collateral complexities. Furthermore, it is doubtful if steam acquires as high an efficiency by passing through the intensely-heated regenerators as is generally supposed, which in my experience accumulate a larger quantity of heat than can be absorbed by the steam. I base this statement upon the fact that in continuous or prolonged operations with superheated steam the hot zone of the regenerator is constantly extending and the waste products in consequence thereof escape from the chimney at so high a temperature that a large amount of heat goes to waste, and also from the fact that the effect produced in gas-making is not so great as the additional heat which is theoretically acquired by the steam would lead one to expect. The action upon the molecules of the water by contact with the heated refractory surfaces of the regenerator is purely a mechanical one, by which they are greatly expanded; but in no sense are their constituent gases (hydrogen and oxygen) permanently disassociated, the chemical change necessary to the forming of carbonic acid being entirely dependent on the actual contact of the oxygen with carbon at certain temperature.

It is the object of my invention, among other things, to remedy these defects, and thereby greatly enhance the capacity and value of the process, and to this end I abandon the use of the regenerative chamber in the sense in which it has been heretofore employed—that is, for superheating the steam and for fixing the olefiant gases. I discard this superheating, partly as to degree and entirely as to manner, applying the heat ordinarily used for superheating the steam to the preheating of the air requisite in aiding the combustion of the fuel; and any increment of heat necessary to raise steam as it leaves the boiler to the height necessary for its decomposition with carbon is imparted to it by the direct action and in the presence of the hot carbon, thus disassociating its constituent gases and uniting the oxygen with the carbon without previously superheating the steam. This hot carbon is provided by blowing a portion of the fuel in the combustion-chamber to a bright incandescence by heated air and heating and igniting the other portion of the fuel by the sensible heat of the products of combustion evolved in bringing the first-mentioned portion to incandescence, these two portions of fuel being alternately driven with the heated air-blast, so that the portion of fuel which during the run of gas is most cooled by the first contact with the steam becomes in turn the hottest part by having this heated air-blast driven through it in the reverse of its former direction, as will presently more fully appear.

In carrying out my invention, in place of the usual secondary or regenerating chamber with its loosely-placed refractory material, I substitute a chamber containing fuel, and thus have two chambers for the combustion of fuel connecting with each other. The hot gases escaping from the one fuel-chamber by the action of an air-blast that is driving the fuel therein to incandescence are forced through the fuel in the second fuel-chamber, (which in the commencement of the operation is not ignited,) their combustible constituents not burning therein, but imparting to said fuel their sensible heat, from which they are conveyed into a third chamber, where, meeting with an air-blast, they are burned. This operation is continued till the fuel in the first-named chamber has attained a state of high incandescence—that is, that degree of heat which may be broadly stated as varying from dull white or yellow to bright red, (in the different parts of the fuel-chamber,) and the fuel in the other chamber has attained a condition of lower incandescence—that is, from bright to dull red. The blast is then shut off, as is also the third chamber, and an outlet-pipe located near the hottest part of the first fuel-chamber is opened and steam is admitted at the coolest part of the second fuel-chamber, which, entering the fuel at its lowest point of incandescence, passes through it, gradually acquiring the additional heat necessary to its decomposition, and instantly on attaining that temperature is decomposed by the action of the carbon into carbonic acid and hydrogen. This gaseous mixture, passing into the other fuel-chamber and through the increasingly hot fuel therein, attains the higher temperature necessary to convert the carbonic acid to carbonic oxide, and is thus completely converted to a pure combustible gas and passes out through the outlet-pipe opened for that purpose, as before described, on its way to the holder. When the temperature of the furnace is sufficiently reduced to make it desirable to reblow with air, the steam is shut off, the gas-outlet is closed, an outlet is opened from the first fuel-chamber, connecting with a fourth chamber, which corresponds in all respects to the third chamber, already described. The passage between the second and third chambers is also opened and an air-blast is driven through the last named, which, by contact with the refractory material therein, becomes highly heated, and entering that part of the fuel in the second fuel-chamber, which by first contact with the steam has become considerably cooled, stimulates a quick and active combustion, so that in turn this becomes the hottest part of the furnace. The hot combustible gases are this time driven in the reverse of the former direction, and, passing through the fuel of the first chamber, are burned in the fourth chamber. When the heat has been sufficiently elevated, the blast and the third and fourth chambers are shut off, an outlet from the second fuel-chamber is opened, and steam is admitted into the first fuel-chamber, and, passing through it and the second chamber in the reverse of the former direction, passes out in the form of water-gas, as before.

The drawings accompanying this specification illustrate one form of furnace for carrying into practical operation the method just stated, it being understood, however, that the structure therein shown is somewhat conventional, as it is obvious the number and shape of the chambers may be varied, as well as their horizontal and vertical relations, to suit local circumstances.

In said drawings.

Figure 6:
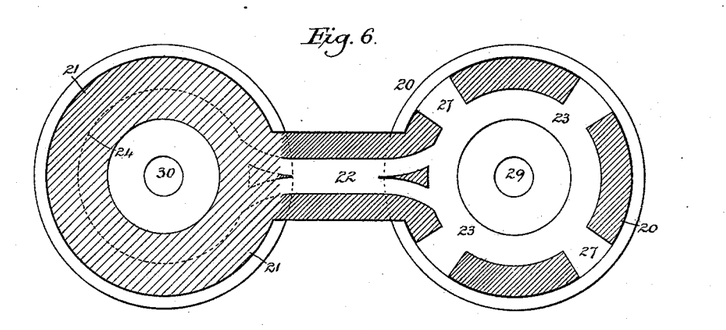
Fig. 6 is a horizontal section taken on the line $z\,z$ of Fig. 4, showing particularly the base of the fuel-chambers.

As shown in the drawings, 20 21 are two fuel-chambers for the combustion of fuel, which are built in the usual manner of firebrick incased in iron plate, and are connected together at their lower ends by a passage, 22, that leads from circular recesses or air-spaces 23 24, which surround the interior of the chambers at their bases. Access is had to these air spaces for stoking and other purposes through doors 25 26, opening into short passages 27 28, respectively. Both chambers have ash-pits 29 30, which are accessible through passages 31, that are closed by doors 32, as is clearly shown in Figs. 1, 3, and 4. The short passages 27 28 are placed with reference to convenient entrance, it being obvious that they may be arranged in different positions. Two of such positions I have shown, one in Figs. 3 and 4 and the other in Figs. 1 and 6, the latter arrangement being preferred.

Figure 4:
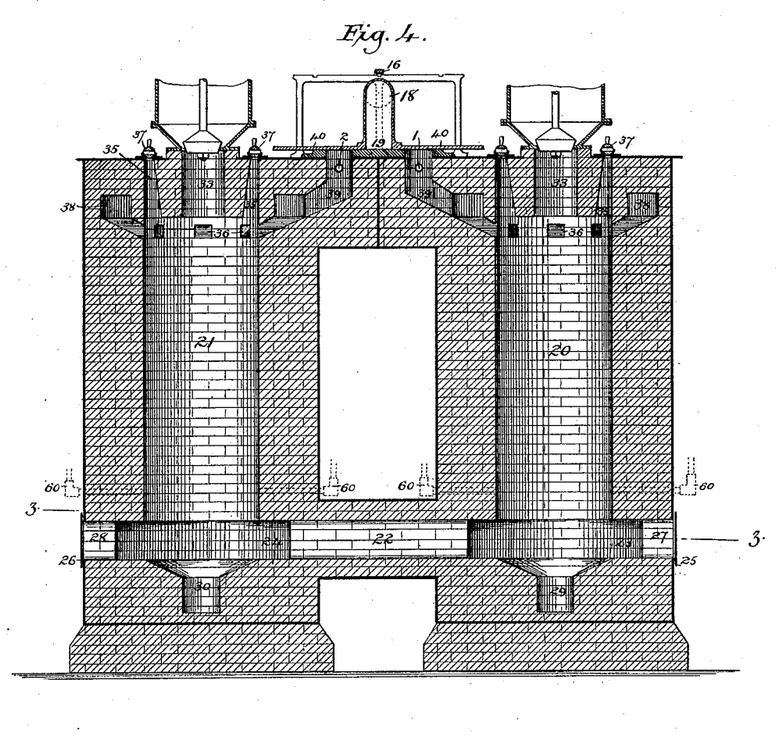
Fig. 4 is a sectional elevation taken on the line $x\,x$ of Fig. 2, showing the interior of the fuel-chambers.
Figure 9:
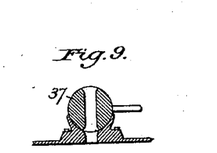
Figs. 9 and 10 are sectional views of one of the stoking-hole covers or lids, showing it in an open and closed position, respectively.
Figure 10:
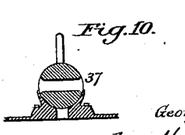

Each chamber has an opening, 33, at its top for the admission of fuel from a fuel-charger, 34, and a series of vertical stoking-holes, 35, each of which is closed by a ball-like cover, 37, resting in a closely-fitting cup and provided with a passage corresponding to said holes 35, which may be turned so as to permit the entrance of the stoking-bar, as is clearly shown in Figs. 4, 9, and 10.

Figure 2:
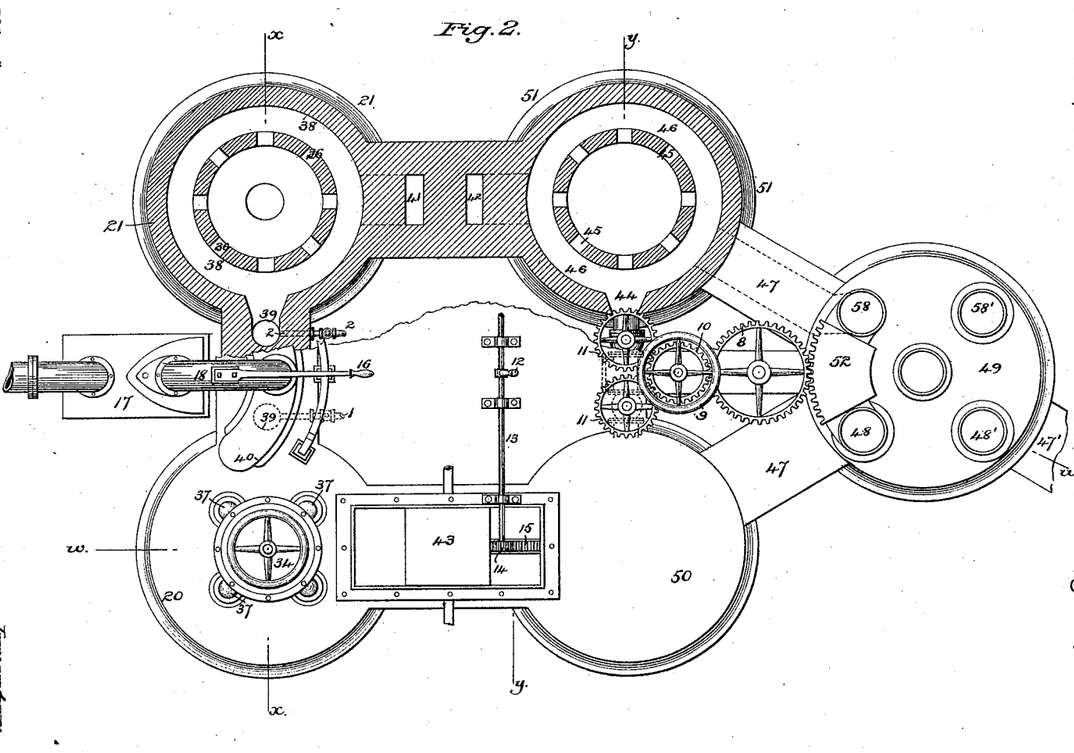
Fig. 2 is a plan view thereof, a portion being cut away to better show the interior construction of two of the chambers.
Figure 7:
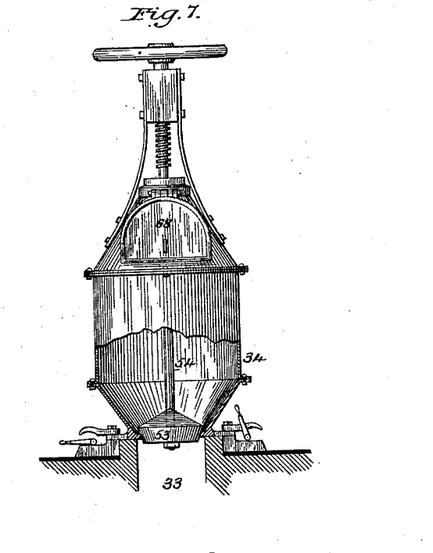
Fig. 7 is a detail view, enlarged, of the fuel-feeding hopper, a portion of the same being broken away to show its interior.
Figure 8:
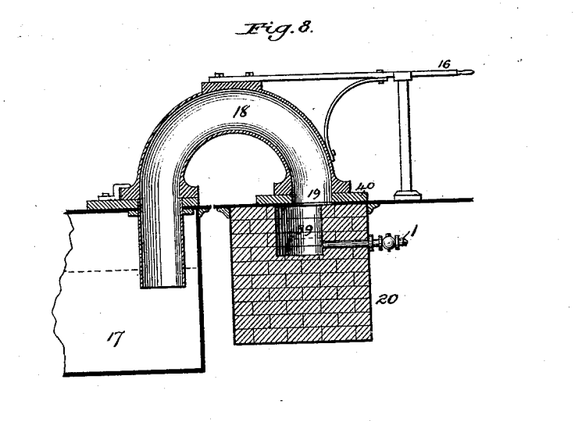
Fig. 8 is a vertical sectional view of the curved pipe for conveying the gas to the hydraulic tank.

The fuel-charger 34 consists of a chamber or hopper secured above the opening 33 in the manner indicated in Fig. 7, said hopper being provided with a door, as 68, for the admission of fuel, and at its bottom with a valve, 53, which is connected with and operated by a screw-rod, 54, so that by raising or lowering said valve the supply of fuel admitted to the fuel-chamber can be regulated. These chambers are also provided at their tops with a series of short upwardly-inclined passages or tuyeres, 36, for the entrance of air and the escape of gas, which connect with a circular recess, 38, within the walls of the chambers, from which leads a passage, 39, opening out of the top of the chambers, and there controlled by a sliding cover, 40. This sliding cover is provided with an opening, 19, from which leads a pipe, 18, connecting with a hydraulic tank, 17, that is suitably arranged between the two fuel-chambers. The said cover is rendered capable of sliding over the two openings 39 of the fuel-chambers, swinging upon a center formed by the connection between its curved pipe and the hydraulic tank 17, which movement is imparted to it through its hand-lever 16, as is clearly seen in Figs. 2 and 8.

Figure 3:
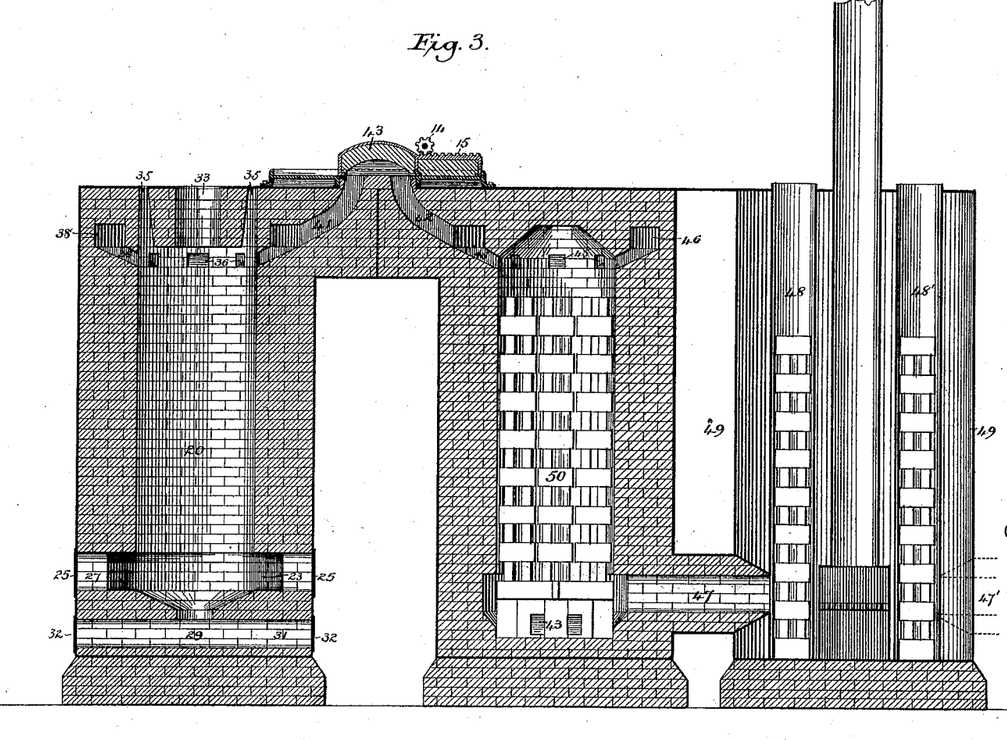
Fig. 3 is a sectional elevation taken on the line $w\,w$ of Fig. 2.

Leading from the recesses 38 in the fuel-chambers are also passages 41, that connect with similar passages, 42, leading from recesses 46 in the top of the air-heating chambers 50 51. The passages 41 42 are controlled by sliding covers 43, that are mounted on ways and are so arranged that by being moved to and fro they close or connect the mouths of the passages, as shown in Fig. 3. These sliding covers 43 are provided with racks 15, that are engaged by gear-wheels 14 upon each end of a rod, 13, held in suitable bearings on the top or cover of the chambers, whereby they may be moved simultaneously through the hand-lever 12. The ways supporting these sliding covers are provided with water-pipes, through which water is conveyed to keep them cool and prevent their warping and thereby becoming out of order, as is common and well known.

Figure 1:
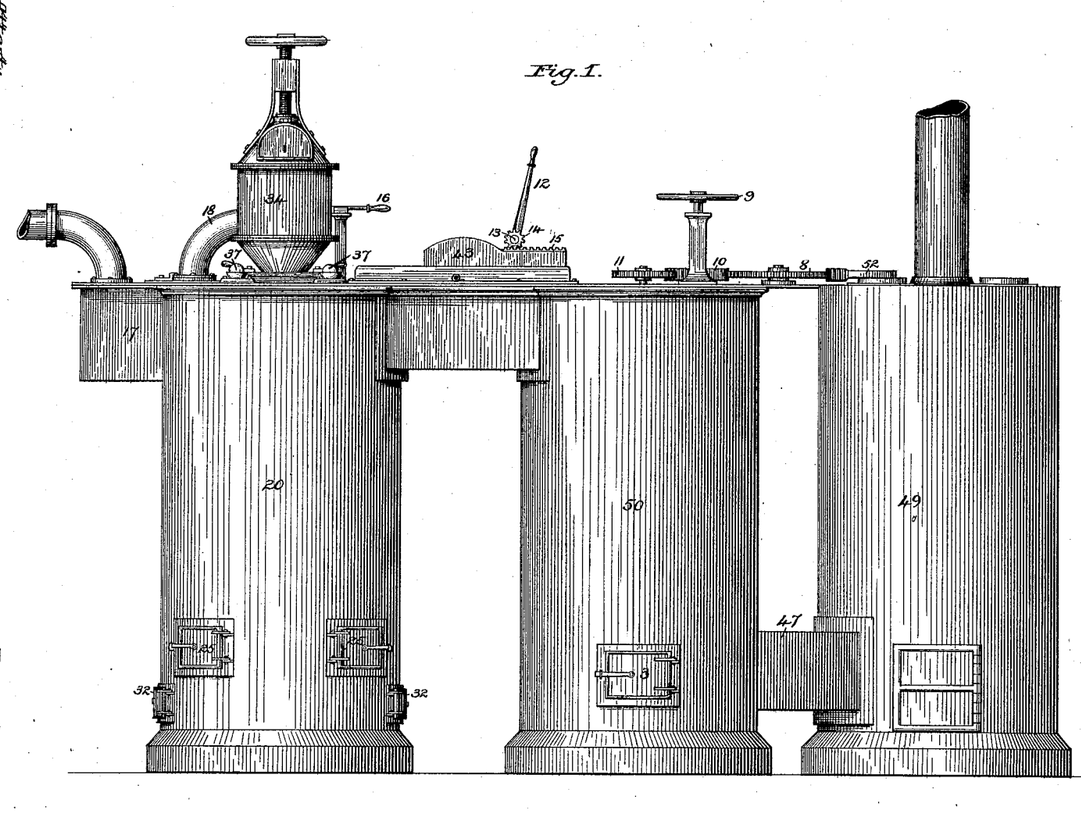
Figure 1 is a side elevation of a furnace arranged to carry out my invention.
Figure 5:
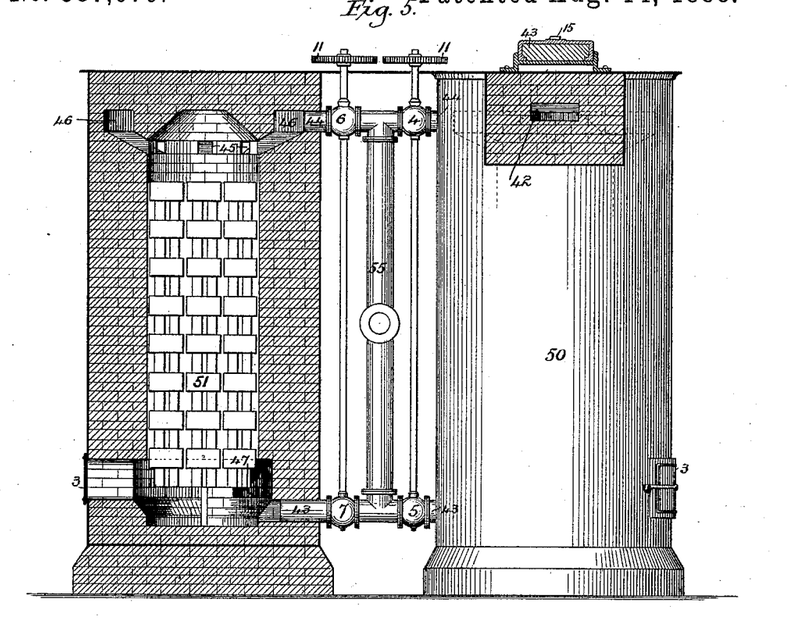
Fig. 5 is a sectional elevation taken on the line $y\,y$ of Fig. 2, showing one of the chambers in elevation.

The air-heating chambers 50 51 are similar in construction to the fuel-chambers, being formed of fire-brick incased in iron plate in the usual manner, and are filled with fire-brick or other refractory material in the ordinary way, and are provided at their bases with air-blast entrances 43 and at or near their upper ends with similar entrances, 44. The entrances 43 each lead into a circular space around the refractory material at the bases of the chambers, while the entrances 44 lead into the circular recesses 46 within the walls of the chambers at their upper ends, from which recesses lead a series of short inclined passages or tuyeres, 45, opening into the chambers 50 51. Access may be had to the interior of the chambers 50 51 through the doors 3, as shown in Figs. 1 and 5. These chambers, as herein shown, are of the same size as the fuel-chambers; but in practice they will be made much larger than the former.

The blast-entrances 43 44 are connected, through suitable T's, with a supply-pipe, 55, which leads from any suitable air-blast apparatus, said entrances being controlled by valves 4 5 6 7, to permit and shut off the ingress of air into the chambers, each pair of valves communicating with the same chamber, having their stems connected together so as to be operated at the same time and in the same direction, the ports in these valves being so arranged that when the valves 4 7 are open the valves 6 5 will be closed, and vice versa. The upper ends of the valve-stems are provided with gear-wheels 11, that mesh with another gear-wheel, 10, that receives motion from a handle-wheel, 9, by which the respective valves are all simultaneously manipulated. The air-heating chambers 50 51 are also provided with short passages 47, that lead from the circular spaces at their bases to pipes or tubes 48 58, arranged within a boiler, 49. It is to be understood that these passages 47 may lead directly to a chimney, allowing the products of combustion to escape directly into the air; but as they carry a considerable amount of heat, which can be utilized in the making of steam, the products are preferably conveyed to a boiler arranged for that purpose. This boiler 49, as illustrated in the drawings, is provided with means for utilizing the heat of these waste products of combustion, which, after passing upward through the refractory material which fills the tubes and absorbs the heat contained thereby, escape into the open air.

It is obvious that if a continuous process of gas-making is desired the duplicate chambers necessary to such continuous operation may be also connected to the boiler in the same manner, so as to allow the waste products of combustion to escape by a similar passage, 47', (shown in dotted lines in Fig. 3,) and through tubes 48' 58' into the open air. These boiler-tubes 48 58 are provided at their upper ends with a sliding valve, 52, which is operated so as to open or close them at the proper time by an intermediate gear-wheel, 8, which meshes with a rack on said sliding valve and with the gear-wheel 10, movement being imparted to the valve through the hand-wheel 9, whereby said valve 52 and the valves controlling the blast-entrances 43 44 are operated and controlled at the same time, as is clearly seen in Figs. 1, 2, and 5, for the purpose to be hereinafter explained.

The method of operating this improved compound furnace in the process of making gas will now be described.

If there are grate-bars above the ash-pits—a matter somewhat decided by the nature of the fuel employed—a fire is kindled thereon, or if bars are not used, then in the ash-pit 29 of fuel-chamber 20, its doors 32 being left open to give air. All other openings, except passages 41 42 and tubes 48, are closed, and thus draft is established from the ash-pit, and the products of combustion pass upward through chamber 20 and tuyere 36 and recess 38 through passages 41 and 42, the sliding valve 43 being moved so as to form a communicating opening between said passages, and from thence downward from recess 46 and tuyere 45, through the refractory material in the air-heating chamber 50, which will become heated thereby, and by passage 47 into boiler-tube 48 and up through the refractory material therein, escaping into the open air. When the fuel in the chamber 20 has been sufficiently ignited to bear the blast, the doors 32 will be closed and the valve 52 will be moved so as to cover the tube 48. In shifting the valve 52 to cover the tube 48, the air-valves 5 6 will be opened, the valves 4 7 remaining closed. The air driven by the blast apparatus will pass through the pipe 55 and enter the base of the heating-chamber 50 through the valve 5 and passage 43 and the top of heating-chamber 51 through the valve 6 and passage 44. The air entering in the base of heating-chamber 50 will pass upward through the refractory material therein and become heated thereby, and thence pass through tuyeres 45, recess 46, and passages 42 41 into the combustion-chamber 20, through recess 38 and tuyeres 36, where the now-heated blast creates an active combustion at the top of the fuel contained therein.

The products of partial combustion, aided to a certain degree by the blast just described, pass downward through the column of fuel in the chamber 20 to the circular space 23 therein, and from thence by the passage 22 into the circular space 24 of the companion chamber, 21, where they pass upward through a column of fuel previously charged therein, but not yet ignited, and in so doing impart their sensible heat to said fuel, thereby igniting the same without extracting any of its carbon, except the minimum percentage, which would enter into combination with a small volume of carbonic acid carried by these products of partial combustion, and which reaction would only occur at a high temperature. Rising from this fuel in chamber 21 the gases pass out by its tuyeres 36, recess 38, and passages 41 and 42, and pass out through recess 46 and tuyeres 45 into the heating-chamber 51, where, meeting the blast of air from the opening 44, they are consumed among the refractory material therein, the products of combustion passing downward and escaping by the passage 47 into the boiler-tube 58, and thence into the open air at a very low temperature. When the fuel in the chamber 20 has attained a degree of incandescence ranging from dull white or yellow to bright red, and the fuel in the chamber 21 a degree of incandescence ranging from bright to dull red, the air-blast is shut off, and the passages 41 and 42 are closed by moving the sliding covers 43. The pipe 18 is shifted so as to communicate with the passage 39 of the chamber 20. Steam is then admitted through the pipe 2 (see Figs. 2 and 4) into the passage 39, leading to the top of the chamber 21, and, passing downward through the fuel contained therein, which is in a state of low incandescence, is raised to the point of decomposition, thereby causing that chemical action already explained to take place. The resulting gases then enter the passage 22, and are conveyed to the bottom of the more highly incandescent fuel in the chamber 20, in passing through which the reconversion of the carbonic acid occurs. The finished product then passes upward through the chamber 20 and escapes through the passage 39 and pipe 18 into the hydraulic tank 17, and from thence to the holder or place of use. Any heat contained in the gas may be utilized by conveying the gas through water, which may be subsequently fed to the boiler or applied to any other useful purpose. When the process of gas-making has been continued until the heat of the furnace requires elevating, the steam is shut off from the pipe 2 and the pipe 18 is shifted so as to close the openings of the passages 39. The covers 43 are shifted so as to connect the passages 41 42, and the cover 52 is shifted so as to close the pipe 58, thereby opening the valves 4 and 7. The air-blast from the pipe 55 then passes through the valve 7 and passage 45 into the base of the chamber 51 and through the valve 4 and passage 44 into the top of the chamber 50. The air entering the base of the chamber 51 will pass upward through the now very hot refractory material contained therein, thereby becoming very highly heated, in which condition it will enter the chamber 21 and stimulate a quick combustion in that part of the fuel which by first contact with the steam has become most cooled. Passing downward through this column of fuel the products of combustion enter the base of the chamber 20, and passing upward through the fuel in that chamber pass over by the passages 41 42 into the top of the chamber 50, where, meeting the blast of air from the passage 44, they are consumed among the refractory material in said chamber, the products of combustion escaping through the passage 47 and tube 48 into the open air. When this firing operation, which, it will be observed, is in the reverse direction of the former, has been continued a sufficient length of time to raise the furnace to the proper temperature, the air-blast will be shut off, and, as before, the covers 43 will be shifted so as to close the passages 41 42, and the gas-making will then be resumed, but in a direction the reverse of the former—that is to say, the pipe 18 will be shifted so as to communicate with the passage 39 of the chamber 21, and steam will be admitted through the pipe 1 into the top of the chamber 20, and so the operation may be continued, the firing and gas-making operations being alternately in reverse directions.

This system of alternation saves the furnace from an excessive or destructive heat at any one point. This method, in the simplest manner possible, overcomes the defects explained as inhering in other systems. Fuel at different and constantly-increasing stages of incandescence being used as a medium and material for both superheating and decomposing the steam and for reconverting the carbonic acid to carbonic oxide, it is manifest that the instant the limit of useful mechanical effect preceding each transformation is reached the chemical effect succeeds without waste of time or temperature. The application of the heat of the ordinary regenerators to the heating of the air for the combustion of the fuel produces a definite and well-understood result in stimulating a rapid and energetic development of heat at the point and in the material where it can be most economically utilized.

While in the system I have described the introduction of steam or air, or both, either at the top or bottom of the furnace, is optional, I find in practice, and especially in the case of preheated air, that if driven against a broad surface of fuel the proportion of slag and the tendency to form channels are reduced, and as it is very desirable to avoid these I have herein presented a construction driven at the top as, all things considered, the most convenient, though an organization in which the order is reversed is contemplated in the invention. I find, also, that with fuels sensitive to a hot blast an injection of a minimum of steam therewith against the upper surface of the fuel produces useful effects.

Fuel can be supplied to the chambers 20 21 as needed, without interrupting the process or opening the furnace, by means of the hoppers 34, as already set forth.

If it is desired to utilize pulverized, granulated, or fluid forms of fuel, such fuel may be fed either continuously or intermittently to the chambers 20 21 during the firing operation, and a suitable device may be substituted for the hoppers 34 for this purpose. The use of fuels of this character will reduce the quantity of lump fuel required and be found more economical than the proposed use of them in connection with superheated steam by other processes.

If it is desired to carburet the gas produced, it is only necessary to inject into the fuel-column at or a little beyond the point where the decomposition of the steam is effected petroleum, its residuals, or other fluids or vaporous hydrocarbons, and these, rapidly expanding, mingle with the water-gas, and by contact with it and the highly incandescent carbon, through which they pass together, experience mutual reactions, by which the losses occurring in the mere mechanical effect of a regenerator are to a great extent avoided. The pipes 60, as shown by dotted lines in Fig. 4, indicate a means by which these carbureting substances may be injected into the fuel-chambers.

Instead of providing two fuel-chambers, as illustrated in the drawings, a similar economical effect may be produced by the use of a single fuel-chamber of sufficient height to admit a depth of fuel sufficient to absorb at one end the sensible heat evolved by the combustion with air at the other. In this case the single fuel-chamber would in effect contain the two masses of fuel, but would require two heating-chambers for alternate blowing, and such or any similar construction which will assure the practical application of the principle of utilizing the heat of the ordinary regenerators in the air for combustion (instead of in steam) and the elevation of the temperature of the steam entirely through the agency and in the presence of hot carbon instead of refractory material, for the reasons before mentioned, is contemplated in the present invention. For reasons of convenience, however, I prefer the general arrangement of two generators, as shown in the accompanying drawings.

The different chambers may be connected by any suitable pipes or passages controlled by any suitable valves; but those shown are preferable. Although different in form they all represent a principle I find very desirable in practice—their covers or valves, being quite free of any lock or fastening and dependent entirely on their own weight, are always kept smooth and tight by moving back and forth over the planed surfaces on which they rest, and are yet instantly removable at will. As it is very desirable to have certain movements of different valves made simultaneously and with precision, I regard the arrangement by which this is accomplished as of great importance, as by this arrangement three single movements are made to control the twelve valves or outlets of the entire furnace.

The construction here shown for the bases of the fuel-chambers I also regard as of great importance.

The spaces 23 24 form a continuous annular opening running around the entire inner circumference of the mason-work, into which the gases pass at all points from the fuel, or vice versa, thus reducing the pressure and the liability to form slag. Were the furnace driven from below with air-blast, and especially a superheated blast, the brick edge of this annular space would require protection by means of water cooling; but driven from above, as I propose, such protection will not generally be required. The alternation of the currents vertically through the columns of fuel drives the ash to the center thereof in the form of a cone, the base resting in the ash-pit, whence the ashes are drawn, as occasion requires, through space 37 and door 32, the cone settling down quietly and the fuel following in the same manner without undue disturbance to the fire. Any slag that forms does so on the outer surface of the column of fuel next to the annular space, whence it is easily removed through the doors 25 26.

The furnace herein shown is not herein claimed, as the same, so far as patentable, forms the subject-matter of another application filed January 14, 1888, Serial No. 260,714, which application is a division of this.

What I claim is—

1. The improvement in the art of making water-gas, which consists in passing the products of partial combustion given off from a mass of burning fuel through a second mass of fuel in order that said products or partial combustion may impart their sensible heat thereto, and then burning said products of partial combustion in a mass of refractory material in an air-heating chamber for the purpose of heating the same, and then passing a blast of air through said air-heating chamber and masses of fuel in the reverse direction, substantially as described.

2. The improvement in the art of making water-gas, which consists, first, in passing the products of partial combustion given off from a mass of burning fuel through a second mass of fuel in order that said products of partial combustion may impart their sensible heat thereto, then burning said products of partial combustion in a mass of refractory material for the purpose of heating the same; second, in passing the steam through said second mass of fuel in the reverse of the direction previously followed by said products of partial combustion, so that the temperature of the steam shall be gradually raised to the point of its decomposition with carbon by the direct action of and in the presence of carbon, and then passing the resulting gases through the first mass of fuel to recarbonize the carbonic acid, and, third, in passing a blast of air through said heated refractory material to heat it, and thence through the two masses of fuel in the came course followed by the steam, substantially as described.

In testimony whereof I have hereunto set my hand in the presence of two subscribing witnesses.

GEORGE SPRING DWIGHT.

Witnesses:
A. S. HOGUE,
J. GRUND.